United States Patent
Kimura (10) Patent No.: US 8,311,396 B2
(45) Date of Patent: Nov. 13, 2012

(54) DVD VIDEO PLAYBACK SYSTEM AND DVD DISK PLAYBACK METHOD

(75) Inventor: Masaru Kimura, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1507 days.

(21) Appl. No.: 11/583,960

(22) Filed: Oct. 18, 2006

(65) Prior Publication Data

US 2007/0122117 A1     May 31, 2007

(30) Foreign Application Priority Data

Oct. 18, 2005  (JP) ................................. 2005-303067

(51) Int. Cl.
*H04N 5/84*  (2006.01)
*H04N 5/89*  (2006.01)

(52) U.S. Cl. ........................................ 386/332; 386/334

(58) Field of Classification Search .......... 386/1, 45–46, 386/95–96, 125–126, 332, 334–336
See application file for complete search history.

(56) References Cited

U.S. PATENT DOCUMENTS

| 5,940,398 | A | 8/1999 | Steigler et al. |
| 6,233,393 | B1 | 5/2001 | Yanagihara et al. |
| 6,370,322 | B2 | 4/2002 | Horiguchi et al. |
| 7,620,300 | B2 * | 11/2009 | Kim et al. .................. 386/248 |
| 2002/0095531 | A1 | 7/2002 | Mori et al. |
| 2003/0152366 | A1 * | 8/2003 | Kanazawa et al. ............. 386/69 |
| 2005/0036757 | A1 | 2/2005 | Romanowski et al. |
| 2006/0056797 | A1 * | 3/2006 | Yun ................................. 386/46 |

FOREIGN PATENT DOCUMENTS

| DE | 19903266 A1 | 8/2000 |
| EP | 1149003 B1 | 8/2000 |
| JP | 10-106142 | 4/1998 |
| JP | 10-145784 | 5/1998 |
| JP | 2003-173614 | 6/2003 |

* cited by examiner

*Primary Examiner* — Thai Tran
*Assistant Examiner* — Nigar Chowdhury
(74) *Attorney, Agent, or Firm* — Brinks Hofer Gilson & Lione (57) ABSTRACT

In a DVD video playback system adapted to transmit data in the form of a PS (program stream) from a source device to each sink device, a navigation manager of the source device stores system parameters, which are necessary for each sink device to decode the PS, in an unused area of a NV_PACK received from a PS demultiplexer and transmits it to a PS multiplexer. The navigation manager of the source device also produces an ORG_PACK in which navigation data necessary for each sink device to decode the PS, and transmits it to the PS multiplexer. The PS multiplexer produces a PS by multiplexing ORG_PACK and NV_PACK received from the navigation manager, V_PACK received from a video transcoder, and A_PACK and SP_PACK received from the PS demultiplexer, and the PS multiplexer transmits the resultant PS to each sink device via an in-vehicle LAN interface.

12 Claims, 6 Drawing Sheets

DVD VIDEO PLAYBACK SYSTEM AND DVD DISK PLAYBACK METHOD

RELATED APPLICATIONS

The present application claims priority to Japanese Patent Application Serial Number 2005-303067, filed on Oct. 18, 2005, the entirety of which is hereby incorporated by reference.

BACKGROUND OF THE INVENTION

1. Field of the Invention

The present invention relates to a DVD video playback system adapted to play back a DVD-Video disk by using a plurality of output devices.

2. Description of the Related Art

In a known DVD video playback system adapted to play back a DVD-Video disk by using a plurality of output devices, the system includes a source device having a DVD drive for reading data from the DVD-Video disk and a plurality of sink devices connected to the source device via a bus or a network, whereby the data read from the DVD-Video disk is transmitted from the source device to each sink device, and each sink device outputs a video image in accordance with the received data (see, for example, PCT Japanese Translation Patent Publication No. 2002-535197).

As a technique associated with such a DVD video playback system, it has been proposed that data transmitted from the source device to each sink device is constructed in the form of a PS (Program Stream) similar to an original PS (in which video data, audio data, subpicture data, etc. are multiplexed) recorded on a DVD-Video disk, and each sink device decodes the received PS into video data, audio data, subpicture data, etc.

In the DVD video playback system including the source device and the plurality of sink devices, it is desirable that the DVD video playback system be capable of playing back a DVD video disk in a similar manner to the manner in which playback is performed by a DVD video playback apparatus according to the DVD-Video standard.

In the DVD video playback apparatus according to the DVD-Video standard, decoding of a program stream (PS) recorded on a DVD-Video disk is performed not such that the PS is simply decoded but such that decoding of the PS is controlled in accordance with various control data recorded on the DVD-Video disk and also in accordance with a playback control operation performed on the DVD video playback apparatus.

This means that if only the PS similar to the original PS read from the DVD-Video disk is transmitted from the source device to each sink device and no other associated control data is transmitted, it is impossible to play back the PS in a similar manner to the manner in which the PS is decoded by the DVD video playback apparatus according to the DVD-Video standard.

In view of the above, it is an object of the present invention to provide a DVD video playback system which includes a source device and a plurality of sink devices, and in which data is transmitted in the form of a PS with a format similar to that of an original PS recorded on a DVD-Video disk from the source device to each sink device thereby making it possible to play back the DVD-Video disk in a similar manner to the manner in which playback is performed in accordance with the DVD-Video standard.

In a case in which the PS including a plurality of streams such as audio streams or the like is sent from the source device to each sink device, each sink device is allowed to, independently of other sink devices, select a desired stream and decode the selected stream. This provides great convenience for users. However, if it is allowed to independently control playback of each sink device, conflict of playback conditions can occur among the sink devices. For example, when the data recorded on the DVD-Video disk includes control data that defines changes in a playback sequence depending on a stream being currently played back, if there is a difference in the decoded and output stream among the sink devices, it is impossible for the source device to definitively determine the following playback sequence.

Thus, it is another object of the present invention to provide a DVD video playback system including a source device and a plurality of sink devices, capable of resolving conflict in playback conditions among the sink devices which can occur when playback of each sink device is independently controlled.

SUMMARY OF THE INVENTION

To achieve the above objects, the present invention provides a DVD video playback system including a source device adapted to read data from a DVD-Video disk and one or more sink devices connected to the source device via a transmission line, the source device including a video data transmission unit adapted to transmit a program stream read from the DVD-Video disk to the one or more sink devices via the transmission line, the program stream including presentation data in a multiplexed form, the transmission being performed after video data included in the navigation data is subjected, or without being subjected, to a data rate conversion, and a control information transmission unit adapted to transmit control information as a part of the program stream to the one or more sink devices by incorporating the control information into the program stream to be transmitted by the video data transmission unit, the control information being not included in the original program stream read from the DVD-Video disk, the control information being for controlling decoding of the presentation data multiplexed in the original program stream read from the DVD-Video data, the sink device including a decoder adapted to decode the presentation data extracted from the program stream received from the source device and reproduce the resultant decoded presentation data, and a decode controller adapted to control the decoding performed by the decoder on the presentation data, in accordance with the control information extracted from the program stream received from the source device.

In this DVD video playback system, the control information transmission unit of the source device may incorporate, into the program stream to be transmitted by the video data transmission unit, a part of navigation data which is not included in the navigation pack multiplexed in the original program stream read from the DVD-Video disk. In this case, the control information transmission unit of the source device may multiplex a pack, in which the part of the navigation data is stored, into the program stream to be transmitted by the video data transmission unit.

In this DVD video playback system, the control information transmission unit of the source device may incorporate at least one or more of the system parameters according to the DVD-Video standard into the program stream to be transmitted by the video data transmission unit, the system parameters being playback control parameters by which to control playback of the DVD-Video disk on the source device. In this case, the control information transmission unit of the source device may store at least one or more of the system parameters in an unused area of the navigation pack multiplexed in the program stream to be transmitted by the video data transmission unit.

In this DVD video playback system, as described above, control information, such as system parameters used as playback control parameters of the source device and/or navigation data which is for controlling decoding of presentation data multiplexed in the program stream and which is not included in the original program stream read from the DVD-Video disk, is transmitted from the source device to the sink devices by incorporating the control information into the program stream transmitted from the source device to the sink devices.

This makes it possible for each sink device to decode the program stream according to the control information in a similar manner to, the manner in which playback is performed by the DVD video playback apparatus according to the DVD-Video standard.

Use of the technique of transmitting the control information such as navigation data and/or system parameters by incorporating the control information in the program stream makes it possible to transmit the control information from the source device to the sink devices in synchronization with the presentation data in a highly reliable fashion.

In the DVD video playback system adapted to transmit at least one or more of the system parameters from the source device to each sink device, there may be further provided a user interface unit connected to the transmission line and adapted to accept a user operation, wherein if the user interface unit accepts a user operation intended to control a particular one of the plurality of sink devices, the user interface unit sends, via the transmission line, user operation information indicating the content of the accepted user operation to the source device and the particular sink device to be controlled by the user operation. In this configuration, the decode controller of each sink device stores, as a local system parameter thereof, a playback control parameter by which to control decoding of the presentation data performed by the decoder, and, if the user operation information is received from the user interface unit, the decode controller changes the local system parameter in accordance with the content of the user operation indicated by the received user operation information. On the other hand, in the source device, when the user operation information is received from the user interface unit, the source device changes a system parameter associated with the source device in accordance with the content of the user operation indicated by the received user operation information. In this case, the decode controller of each sink device may change the local system parameter so as to be equal to a system parameter extracted from the program stream received from the source device.

In the DVD video playback system configured in the above-described manner, a local system parameter of a sink device is changed in response to a user operation so as to allow the decoder of the sink device to perform decoding in accordance with the user operation, while maintaining the coincidence between the system parameters of the source device and the local system parameters of the sink device.

In the DVD video playback system adapted to transmit at least one or more of the system parameters from the source device to each sink device, the DVD video playback system may include a plurality of sink devices and a user interface unit adapted to accept a user operation and connected to the transmission line, wherein if the user interface unit accepts a user operation intended to control a particular one of the plurality of sink devices, the user interface unit sends, via the transmission line, user operation information indicating the content of the accepted user operation to the source device and the particular sink device to be controlled by the user operation, the decode controller of each sink device stores, as a local system parameter, a playback control parameter by which to control decoding the presentation data performed by the decoder, and, if the user operation information is received from the user interface unit, the decode controller changes the local system parameter in accordance with the content of the user operation indicated by the received user operation information.

In this configuration including the plurality of sink devices, if the source device receives, from the user interface, the user operation information indicating the content of the user operation intended to control a predetermined particular one of the plurality of sink devices, the source device may change the system parameter associated with the source device in accordance with the content of the user operation indicated by the received user operation information.

This prevents the source device from having a difficulty in a playback operation, which can occur due to local system parameter conflict among sink devices.

In this configuration including the plurality of sink devices, the source device may further include a sink parameter manager adapted to manage the value of a local system parameter of each sink device in accordance with the user operation information received from the user interface unit, the user operation information indicating the content of the user operation intended to control each sink device, and a system parameter conflict resolver adapted to resolve system parameter conflict such that when conflict in a playback condition of the DVD-Video disk occurs which cannot be resolved even if any local system parameter value managed by the sink parameter manager is employed as the value of a corresponding system parameter of the source device, the local system parameter values managed by the sink parameter manager are employed as candidates for the value of the system parameter, one value is selected from the candidates for the value of the system parameter in accordance with a predetermined rule, and the selected value is used as the value of the system parameter of the source device in the following operation. More specifically, in the system parameter conflict resolver, a most recently updated value may be selected from the candidates for the value of the system parameter and the selected value may be employed as the system parameter value for use thereafter for the source device. Alternatively, the system parameter conflict resolver may select a value specified by a user from the candidates for the value of system parameter and may employ the selected value as the system parameter value for use thereafter for the source device.

Thus, the source device can resolve local system parameter conflict among sink devices.

The technique of updating the system parameters of the source device in accordance with a user operation intended to control a particular sink device and the technique of providing the system parameter conflict resolver in the DVD video playback system to resolve conflict of local system parameters among a plurality of sink devices can also be applied to a DVD video playback system in which a source device does not transmit system parameters to sink devices or system parameters transmitted from the source device to the sink devices are not multiplexed in the program stream. That is, in a case in which it is sufficient to prevent or resolve conflict of system parameters in the DVD video playback system, the DVD video playback system may be configured such that the source device does not transmit the system parameters to the sink devices or such that the source device transmits the system parameter to the sink devices without multiplexing them in the program stream.

The DVD video playback system described above may be installed in a vehicle.

The technique of transmitting the control information from the source device to the sink devices by incorporating them into the program stream including presentation data in a multiplexed form, and the technique of processing the system parameters of the source device or the local system parameters of the sink devices in accordance with a user operation accepted by the user interface unit can be applied not only to the DVD playback system adapted to play back a DVD-Video disk but also to a DVD playback system adapted to play back an another type of DVD disk such as a DVD-Audio disk on which a program stream including presentation data, navigation data, and/or the like in a multiplexed form is recorded.

As described above, the present invention provides great advantages. That is, in a DVD video playback system including a source device and one or more sink devices, data transmitted from the source device to each sink device is constructed in the form of a program stream with a format similar to that of a program stream recorded on a DVD-Video disk whereby it is allowed to play back video data in a similar manner to the manner in which playback is performed in accordance with the DVD-Video standard. In a DVD video playback system including a source device and a plurality of sink devices, playback conditions of each sink devices are controlled independently of other sink devices, and conflict of playback conditions is resolved if conflict occurs.

DESCRIPTION OF THE PREFERRED EMBODIMENTS

A DVD video playback system according to an embodiment of the present invention is described below taking as an example a DVD video playback system installed in a vehicle.

Figure 1:
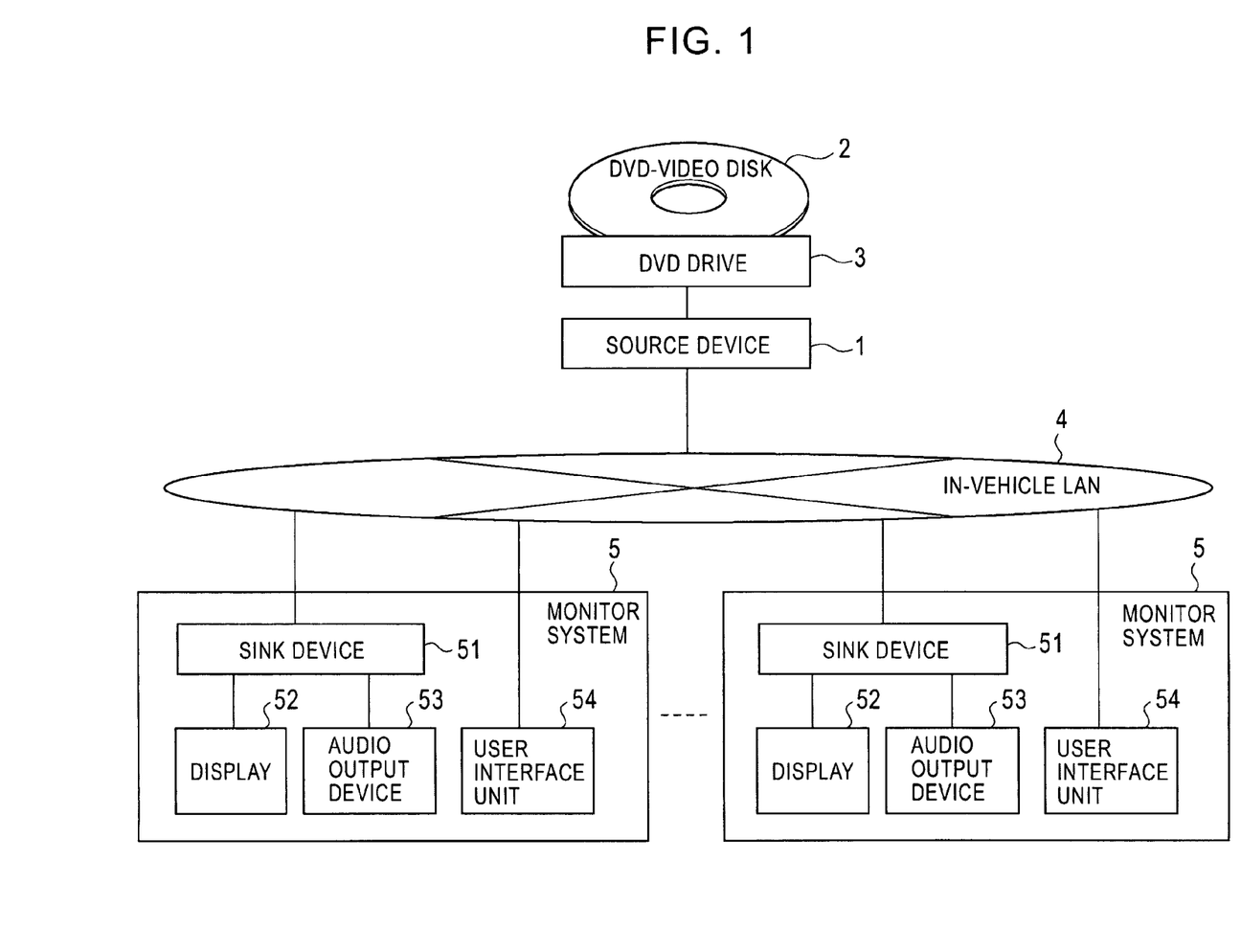
FIG. 1 is a block diagram showing a configuration of a DVD video playback system according to an embodiment of the present invention.

FIG. 1 shows a configuration of the DVD video playback system according to the present embodiment.

As shown in FIG. 1, the DVD video playback system includes a source device 1, a DVD drive 3 provided as an external storage device of the source device 1 and adapted to access a DVD-Video disk 2 mounted on the DVD drive 3, an in-vehicle LAN 4, and one or more monitor systems 5. Each monitor system 5 includes a sink device 51, a display 52 adapted to display an image according to video data input from the sink device 51, an audio output device 53 adapted to reproduce a voice/sound according to audio data input from the sink device 51, and a user interface unit 54.

The source device 1, each sink device 51, and each user interface unit 54 are connected to the in-vehicle LAN 4. The in-vehicle LAN 4 may be shared with the DVD video playback system and other systems, that is, the in-vehicle LAN 4 may also be connected to one or more devices of the other systems.

Figure 2:
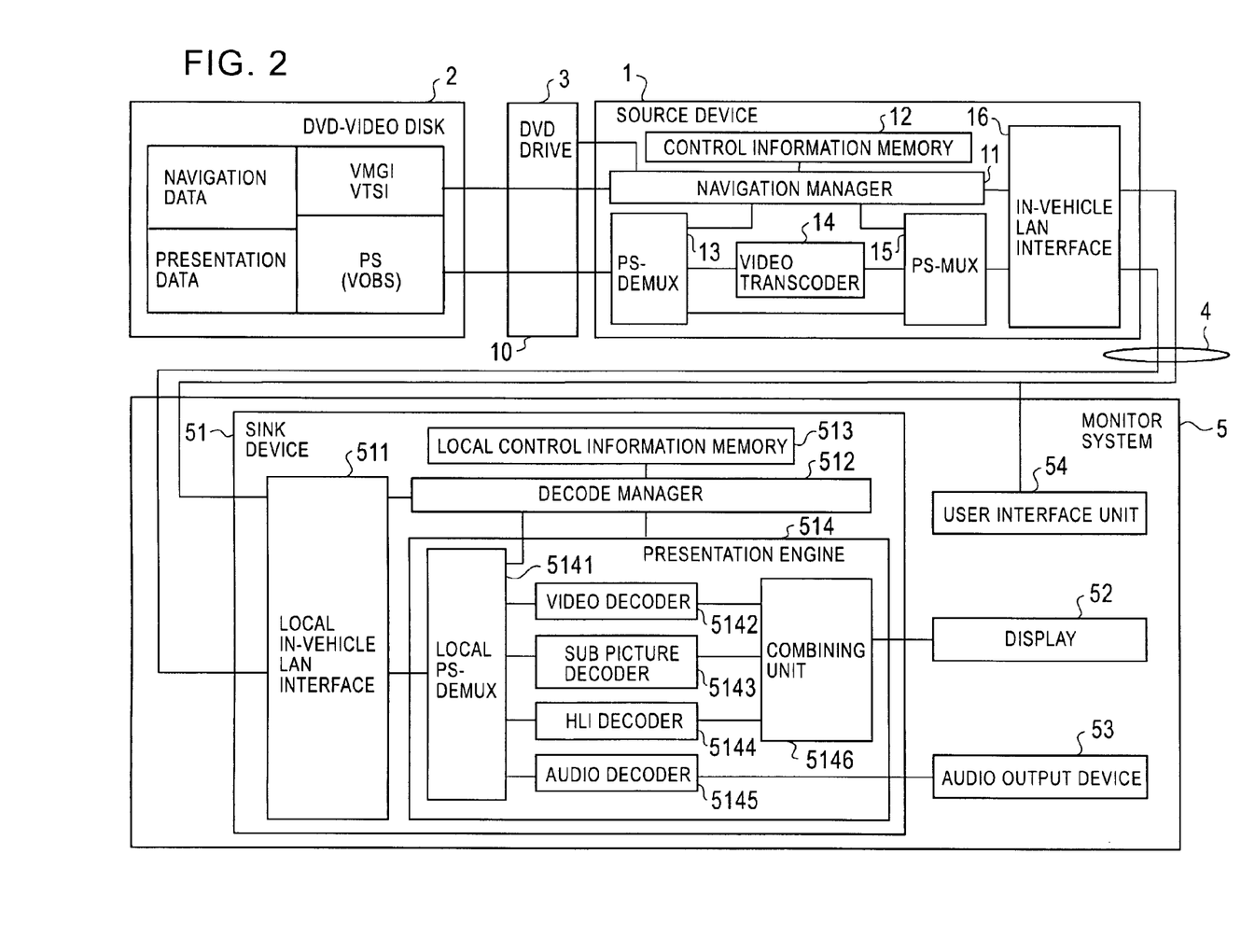
FIG. 2 is a block diagram showing configurations of a source device and a sink device according to an embodiment of the present invention.

FIG. 2 shows internal configurations of the source device 1 and the sink device 51. One or more video titles are recorded on the DVD-Video disk 2. As shown in FIG. 2, each video title includes mainly two types of data: presentation data that is content of a presentation presented to a user, and navigation data that controls execution of the presentation.

The presentation data and a part of the navigation data are in the form of a PS (Program Stream) stored in VMGM_VOBS (video object set for VMG menu), VTSM_VOBS (video object set for VTS menu), or VTSTT_VOBS (video object set for the title of the video title set) recorded on the DVD-Video disk 2, and the other navigation data are recorded as VMGI (video manager information) or VTSI (video title set information) on the DVD-Video disk 2.

Figure 3A:
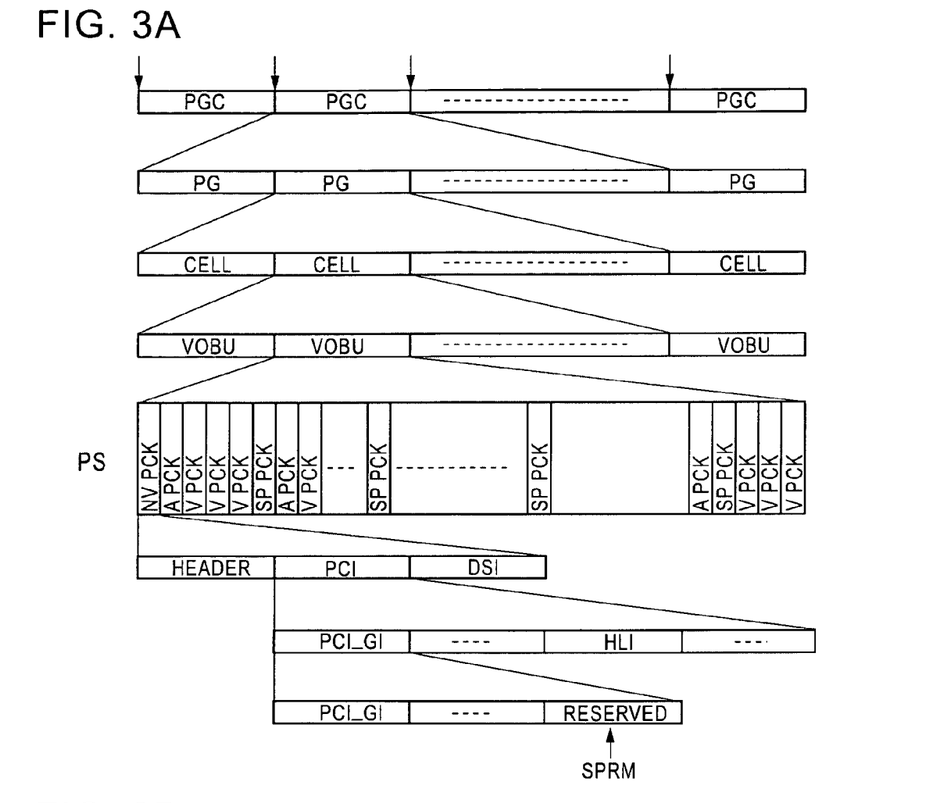
FIGS. 3A and 3B are diagrams showing a format of a program stream transmitted between a source device and a sink device in a DVD video playback system according to an embodiment of the present invention.

As shown in FIG. 3A, playback of the DVD-Video disk 2 is performed in units of PGCs. Each PGC includes one or more PGs, each PG includes one or more cells, and each cell includes one or more VOBUs (video object unit). Each VOBU includes one NV_PACK (navigation pack), one or more (or no) V_PACKs (video packs), one or more (or no) A_PACKs (audio packs), and one or more (or no) SP_PACKs (sub-picture packs). The NV_PACK includes playback control information (PCI) and data search information (DSI). The PCI includes highlight information (HLI) that defines buttons in a menu.

The PGCs, PGs and cells are defined by navigation data described above. In FIG. 3A, VOBUs are included in one of VMGM_VOBS, VTSM_VOBS, and VTSTT_VOBS, and a sequence of VOBUs corresponds to a PS.

In each VOBU, NV_PACK is navigation data multiplexed in a PS, and V_PACKs, A_PACKs and SP_PACKs are presentation data multiplexed in the PS. Moving picture data is stored in each V_PACK, audio data is stored in each A_PACK, and subpicture data is stored in each SP_PACK.

Referring again to FIG. 2, the source device 1 includes a navigation manager 11, a control information memory 12, a PS demultiplexer (PS-Demux) 13, a video transcoder 14, a PS multiplexer (PS-Mux) 15, and an in-vehicle LAN interface 16.

In the configuration described above, the PS demultiplexer 13 demultiplexes the PS input from the DVD-Video disk 2 via the DVD drive 3 into NV_PACKs, V_PACKs, A_PACKs, and SP_PACKs. The NV_PACKs extracted from the PS are sent to the navigation manager 11, the V_PACKs extracted from the PS are sent to the video transcoder 14, and the A_PACKs and SP_PACKs extracted from the PS are sent to the PS multiplexer 15. The video transcoder 14 performs a data rate conversion on the moving picture data of V_PACKs received from the PS demultiplexer 13 and sends V_PACKs including the moving picture data with the converted data rate to the PS multiplexer 15.

The navigation manager 11 controls a playback operation including a determination of a playback sequence of the PS of the DVD-Video disk 2 and reading of the PS from the DVD-Video disk 2 according to the determined playback sequence in accordance with VMGI and VTSI read from the DVD-Video disk 2 via the DVD drive 3 and in accordance with navigation data described in NV_PACKs received from the PS demultiplexer 13. The navigation manager 11 stores acquired navigation data and system parameters representing a current playback control status in the control information memory 12 and manages these data.

More specifically, as shown in FIG. 3A, the navigation manager 11 stores system parameters necessary for the sink device 51 to decode the PS in a reserved area in PCI_GI of PCI of a NV_PACK received from the PS demultiplexer 13, and the navigation manager 11 sends them to the PS multiplexer 15. The navigation manager 11 also produces an ORG_PACK in which navigation data necessary for the sink device 51 to decode the PS is described, and sends the resultant ORG_PACK to the PS multiplexer 15.

Figure 3B:
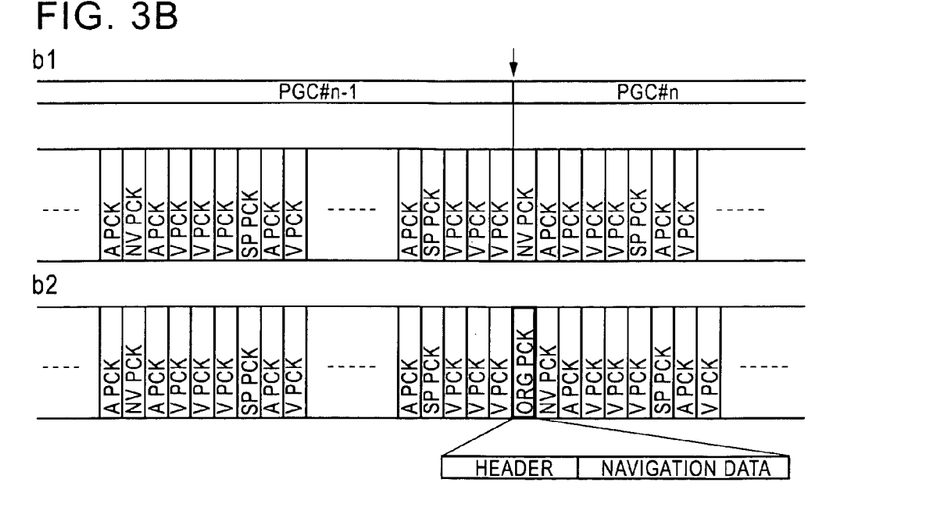

The PS multiplexer 15 reconstructs the PS by multiplexing the ORG_PACK and the NV_PACK received from the navigation manager 11, the V_PACK received from the video transcorder 14, and the A_PACK and the SP_PACK received from the PS demultiplexer 13. The resultant reconstructed PS is output to the in-vehicle LAN interface 16. The in-vehicle LAN interface 16 transfers the PS received from the PS multiplexer 15 to the respective sink devices 51 via the in-vehicle LAN 4. In the above process, as shown in FIG. 3B, the multiplexing of ORG_PACKs into the PS transmitted to the respective sink devices 51 is performed, for example, by inserting an ORG_PACK at the beginning of each PGC ((1) in FIG. 3B) to be multiplexed so as to obtain the PS as shown in (2) of FIG. 3B.

The navigation data in this ORG_PACK includes data associated with the PGC immediately following this ORG_PACK, such as video attributes of the PGC of interest (represented by one of VMGM_V_ATR, VTSM_V_ATR, and VTS_V_ATR), the number of audio streams in the PGC of interest (represented by one of VMGM_AST_Ns, VTSM_AST_Ns, and VTS_AST_Ns), audio attributes of the PGC of interest (represented by one of VMGM_AST_ATR, VTSM_AST_ATR, and VTS_AST_ATR), the number of the subpicture streams in the PGC of interest (represented by one of VMGM_SPST_Ns, VTSM_SPST_Ns, and VTS_SPST_Ns), subpicture attributes of the PGC of interest (represented by one of VMGM_SPST_ATR, VTSM_SPST_ATR, and VTS_SPST_ATR), the decoding stream number of each audio stream in the PGC of interest (represented by PGC_AST_CTL of PGC_GI of PGCI of the PGC of interest), the decoding stream number of each subpicture stream (represented by PGC_SPST_CTLT of PGC_GI of PGCI of the PGC of interest), still time values of cells in the PGC of interest (represented by PGC_NV_CTL of PGC_GI of PGCI of the PGC of interest), palette data of a subpicture of the PGC of interest (represented by PGC_SPST_CTLT of PGC_GI of PGCI of the PGC of interest), categories of cells in the PGC of interest (represented by C_CAT of C_PBIT of PGCI of the PGC of interest).

The video attributes, the audio attributes, and the subpicture attributes are used, in the decoding of the PS, by the sink device 51 to determine encoding attributes or displaying attributes of the video stream, the audio system, and the subpicture stream included in the PS.

The number of audio streams, the decoding stream number of each audio stream, the number of subpicture streams, and the decoding stream number of each subpicture stream are used by the sink device 51 to determine a stream to be decoded, when the PS includes a plurality of audio streams or subpicture streams.

The palette data of each subpicture is used by the sink device 51 to determine the color in which to draw the subpicture.

The still time value and the category of each cell are used by the sink device 51 to play back a still image or to perform seamless playback.

The system parameters, which are stored in an unused (reserved) area of PCI_GI of NV_PACK and transmitted to the sink devices 51, include the audio stream number SPRM (1), the subpicture stream number SPRM(2), and the selected and highlighted button number SPRM(8).

Referring again to FIG. 2, each sink device 51 includes a local in-vehicle LAN interface 511, a decode manager 512, a local control information memory 513, and a presentation engine 514. The presentation engine 514 includes a local PS demultiplexer 5141, a video decoder 5142, a subpicture decoder 5143, a HLI decoder 5144, an audio decoder 5145, and a combining unit 5146.

In the configuration described above, the local PS demultiplexer 5141 demultiplexes the PS received by the in-vehicle LAN interface 511 from the source device 1. A resultant ORG_PACK and a NV_PACK extracted from the PS are sent to the decode manager 512, a V_PACK extracted from the PS is sent to the video decoder 5142, an A_PACK extracted from the PS is sent to the audio decoder 5145, and a SP_PACK extracted from the PS is sent to the subpicture decoder 5143. The local PS demultiplexer 5141 sends HLI included in the NV_PACK extracted from the PS to the HLI decoder 5144.

The video decoder 5142 decodes the moving picture data included in the received V_PACK and sends resultant decoded moving picture data to the combining unit 5146. The subpicture decoder 5143 decodes subpicture data included in the received SP_PACK and sends resultant decoded subpicture data to the combining unit 5146. The HLI decoder 5144 decodes the received HLI and sends resultant decoded data to the combining unit 5146. The combining unit 5146 produces an image including the received subpicture and a button defined by the HLI and combines the resultant image with the received moving picture image thereby producing an image to be displayed. The resultant image is reproduced on the display 52. The audio decoder 5145 decodes audio data included in the A_PACK and sends resultant decoded audio data to the audio output device 53.

The above-described decoding operation of the PS performed by the presentation engine 514 is controlled by the decode manager 512 in accordance with the navigation data included in the NV_PACK extracted from the PS by the local demultiplexer 5141, the navigation data included in the ORG_PACK extracted from the PS by the local PS demultiplexer 5141, the local system parameters locally managed by the decode manager 512. The navigation data and the local system parameters are stored and managed using the local control information memory 513.

The local system parameters include the audio stream number SPRM(1) specifying an audio stream, of the plurality of audio streams included in the received PS, to be decoded by the audio decoder 5145 (that is, the audio stream number SPRM(1) specifies an A_PCK that is to be sent to the audio decoder 5145 from the local PS multiplexer 5141), the subpicture stream number SPRM(2) specifying a subpicture stream, of the plurality of subpicture streams included in the received PS, to be decoded by the subpicture decoder 5143 (that is, the subpicture stream number SPRM(2) specifies a SP_PCK that is to be sent to the subpicture decoder 5143 from the local PS demultiplexer 5141), and a highlight button number SPRM(8) specifying a button, of the plurality of buttons defined by the HLI, to be highlighted to indicate that the button is in a selected state.

In accordance with values of these local system parameters, the decode manager 512 controls the audio stream and the subpicture stream decoded by the presentation engine 514 and the button displayed in the highlighted fashion by the presentation engine 514 to indicate that the button is in the selected state.

Processing of the local system parameters and the system parameters managed by the source device 1 is described below.

If the user interface unit 54 of each monitor system 5 accepts a user operation performed by a user to issue an audio stream change command, a subpicture stream change command, or a selection button change command, then the user interface unit 54 sends, via the in-vehicle LAN 4, user operation information indicating the command issued by the user to the navigation manager 11 of the source device 1 and to the decode manager 512 of the sink device 51 belonging to the same monitor system 5 as that to which the user interface unit 54 belongs.

Note that the sink device 51 of a particular one of the plurality of monitor systems 5 is prespecified as a master sink device 51.

The three system parameters associated with the source device 1, that is, the audio stream number SPRM(1), the subpicture stream number SPRM(2), and the selected and highlighted button number SPRM(8), are controlled by the navigation manager 11 such that if a navigation command specifying to change a system parameter to a particular value is included in the navigation data acquired from the DVD-Video disk 2, the navigation manager 11 changes the specified system parameter to the specified value. More specifically, if the user operation information, sent to the navigation manager 11 from the user interface unit 54 belonging to the same monitor system 5 as that to which the master sink device 51 belongs, specifies that the audio stream should be changed, then the navigation manager 11 changes the audio stream number SPRM(1) in accordance with the received user operation information. If the user operation information, sent to the navigation manager 11 from the user interface unit 54 belonging to the same monitor system 5 as that to which the master sink device 51 belongs, specifies that the subpicture stream should be changed, then the navigation manager 11 changes the subpicture stream number SPRM(2) in accordance with the received user operation information. On the other hand, if the user operation information, sent to the navigation manager 11 from the user interface unit 54 belonging to the same monitor system 5 as that to which the master sink device 51 belongs, specifies that the selected and highlighted button should be changed, then the navigation manager 11 changes the selected and highlighted button number SPRM(8) in accordance with the received user operation information.

On the other hand, the three system parameters associated with each sink device 51, that is the audio stream number SPRM(1), the subpicture stream number SPRM(2), and the selected and highlighted button number SPRM(8) are controlled as follows. That is, if the user operation information, sent to the decode manager 512 from the user interface unit 54 belonging to the same monitor system 5 as that to which the sink device 51 belongs, specifies that the audio stream should be changed, then the audio stream number SPRM(1) is changed in accordance with the received user operation information. When the user operation information, sent to the decode manager 512 from the user interface unit 54 belonging to the same monitor system 5 as that to which the sink device 51 belongs, specifies that the subpicture stream should be changed, then the subpicture stream number SPRM(2) is changed in accordance with the received user operation information. On the other hand, if the user operation information, sent to the decode manager 512 from the user interface unit 54 belonging to the same monitor system 5 as that to which the sink device 51 belongs, specifies that the selected and highlighted button should be changed, then the selected and highlighted button number SPRM(8) is changed in accordance with the received user operation information.

The three system parameters, the audio stream number SPRM(1), the subpicture stream number SPRM(2), and the selected and highlighted button number SPRM(8), associated with the master sink device 51 are also changed depending on the values of the system parameters sent from the source device 1 and the local system parameters stored in the local control information memory 513 such that when some system parameter described in the NV_PACK extracted by the local PS demultiplexer 5141 from the PS received from the source device 1 is different from the corresponding local system parameter stored in the local control information memory 513, the local system parameter stored in the local control information memory 513 is changed so as to become equal to the value of the corresponding system parameter received from the source device 1.

The three system parameters, the audio stream number SPRM(1), the subpicture stream number SPRM(2), and the selected and highlighted button number SPRM(8), associated with a sink device 51 other than the master sink device 51 are also changed depending on the values of the system parameters sent from the source device 1 and the local system parameters stored in the local control information memory 513 such that when the system parameters described in the NV_PACK extracted by the local PS demultiplexer 5141 from the PS received from the source device 1 have been set in accordance with a navigation command, if some system parameter received from the source device 1 is different from the corresponding local system parameter stored in the local control information memory 513, then this local system parameter stored in the local control information memory 513 is changed so as to become equal to the value of the corresponding system parameter received from the source device 1.

The determination as to whether the system parameters described in the NV_PACK sent from the source device 1 are those set according to the navigation command can be made as follows. For example, the source device 1 adds information indicating whether each system parameter has been set in accordance with a navigation command to the NV_PACK including the three system parameters, the audio stream number SPRM(1), the subpicture stream number SPRM(2), and the selected and highlighted button number SPRM(8), such that the sink device 51 can determine whether the value of each system parameter received from the source device 1 has been set in accordance with a navigation command, on the basis of the above-described additional information.

Figure 4:
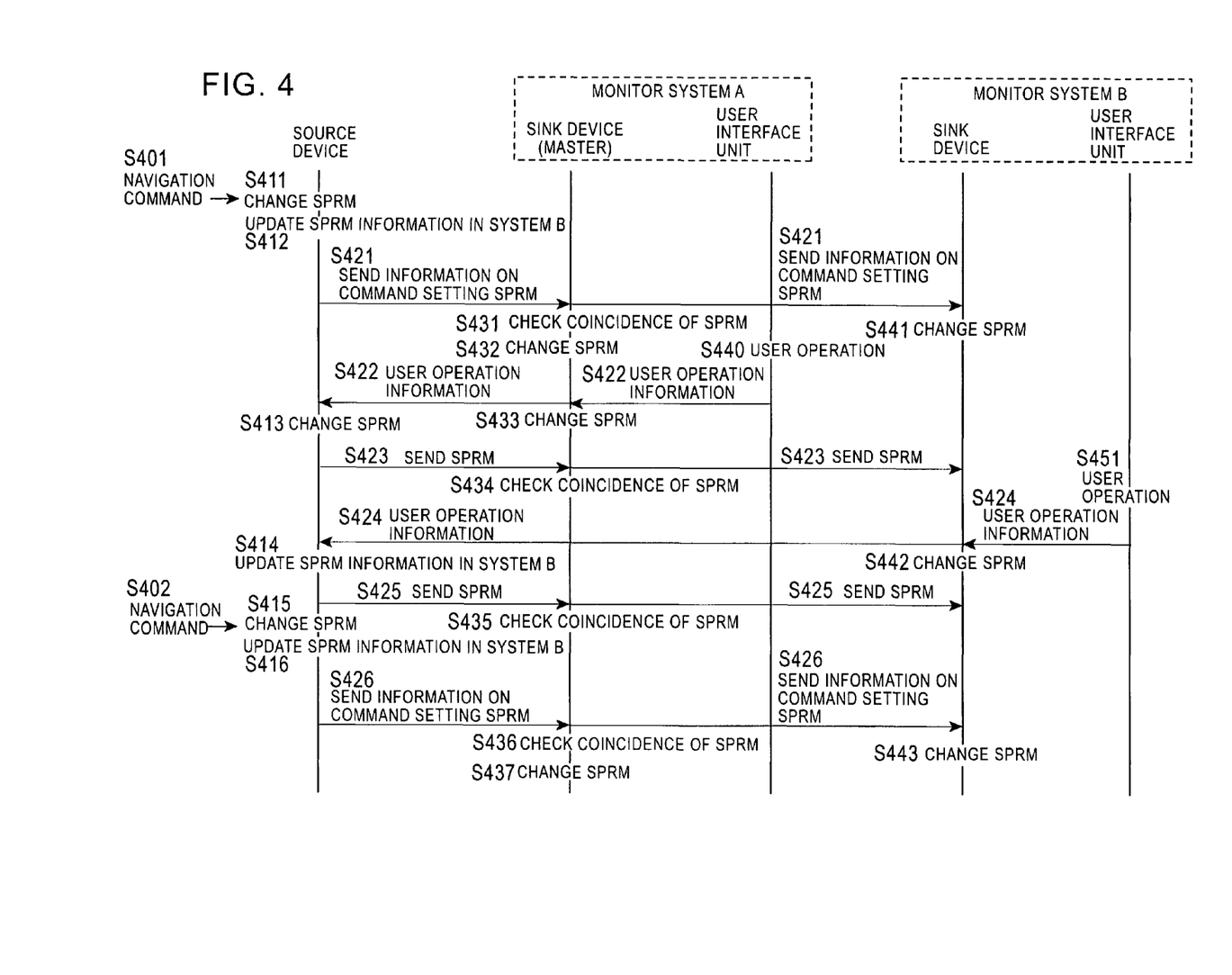
FIG. 4 is a sequence diagram showing an example of an operation of a DVD video playback system according to an embodiment of the present invention.

FIG. 4 shows an example of a manner in which the local system parameters managed by the sink device 51 and the system parameters managed by the source device 1 (the audio stream number SPRM(1), the subpicture stream number SPRM(2), and the selected and highlighted button number SPRM(8)) are processed.

Herein, by way of example, it is assumed that the DVD video playback system includes two monitor systems 5, a monitor system A and a monitor system B, and the sink device 51 of the monitor system A is prespecified as the master sink device 51. In the example shown in FIG. 4, after the navigation manager 11 of the source device 1 starts playback of the DVD-Video disk 2, the navigation manager 11 of the source device 1 executes a navigation command (step S401) to set the system parameters (the audio stream number SPRM(1), the subpicture stream number SPRM(2), and the selected and highlighted button number SPRM(8) (note that the system parameters are these three parameters elsewhere below in the discussion)) of the source device 1 (step S411). Thereafter, the source device 1 sends, to each sink device 51, the values of the system parameters together with information indicating that these values of the system parameters are those set in accordance with the navigation command (step S421).

If the master sink device 51 of the monitor system A receives the system parameters from the source device 1 (step S421), the master sink device 51 of the monitor system A determines whether the values of the local system parameters (the audio stream number SPRM(1), the subpicture stream number SPRM(2), and the selected and highlighted button number SPRM(8) (note that the local system parameters are these three parameters elsewhere below in the discussion)) are equal to the values of the system parameters received from the source device 1 (step S431). In this specific case, they are not equal, and thus the values of the local system parameters are changed so as to be equal to the values of the system parameters received from the source device 1 (step S432).

On the other hand, in the sink device 51 of the monitor system B, when the system parameters are received from the source device 1 (step S421), the values of the local system parameters are unconditionally changed so as to be equal to the values of the system parameters received from the source device 1 (S441), because the values of the system parameters received from the source device 1 are the values set by the navigation command.

Thereafter, if the user interface unit 54 of the monitor system A accepts a user operation performed by a user to specify to change a system parameter (step S440), user operation information indicating the content of the operation is sent to the source device 1 and the master sink device 51 of the monitor system A (step S422).

If the master sink device 51 receives the user operation information, the master sink device 51 changes the value of the specified local system parameter in accordance with the received user operation information (step S433). On the other hand, in the source device 1, when the user operation information is received, because the user operation information is that sent from the user interface unit 54 belonging to the same monitor system A as that to which the master sink device 51 belongs, the source device 1 changes the value of the system parameter of the source device 1 according to the user operation information (step S413).

In this case, thereafter, the value of the system parameter changed in accordance with the operation performed on the user interface unit 54 of the monitor system A is sent from the source device 1 to each sink device 51 (step S423). If the sink device 51 of the monitor system A receives the value of the system parameter, the sink device 51 determines whether the value of the local system value is equal to the value of the system parameter received from the source device 1 (step S434). In this specific case, because they are equal, no change is made in the values of the local system parameters. In the sink device 51 of the monitor system B, when the value of the system parameter is received from the source device 1, no change is made in the value of the local system parameter, because the value of the system parameter received from the source device 1 is not that set by the navigation command.

If the user interface unit 54 of each monitor system B accepts a user operation performed by a user to specify to change a system parameter (step S451), user operation information indicating the content of the operation is sent to the source device 1 and the sink device 51 of the monitor system B (step S424). If the sink device 51 of the monitor system B receives the user operation information, the sink device 51 changes the value of the local system parameter in accordance with the received user operation information (step S442). On the other hand, in the source device 1, when the user operation information is received, no change is made in the value of the system parameter, because the received user operation information is not that sent from the user interface unit 54 belonging to the same monitor system A as that to which the master sink device 51 belongs.

In this case, because no change is made in the value of the system parameter of the source device 1, the same value of the system value as the previous value is sent from the source device 1 to each sink device 51 (step S425). When the master sink device 51 of the monitor system A receives the value of the system parameter from the source device 1, the master sink device 51 determines whether the value of the local system parameter is equal to the value of the system parameter received from the source device 1 (step S435). In this specific case, because they are equal, no change is made in the value of the local system parameter. In the sink device 51 of the monitor system B, no change is made in the value of the local system parameter, because the value of the system parameter received from the source device 1 is not that set by the navigation command.

Thereafter, if the navigation manager 11 of the source device 1 again executes a navigation command (step S402) whereby a system parameter of the source device 1 is set (step S415), the source device 1 sends, to each sink device 51, the value of the system parameter together with information indicating that these value of the system parameter is that set in accordance with the navigation command (step S426).

The master sink device 51 of the monitor system A determines whether the value of the local system parameter is equal to the value of the system parameter received from the source device 1 (step S436). In this specific case, because they are not equal, the value of the local system parameter is changed so as to be equal to the value of the system parameter received from the source device 1 (step S437). On the other hand, in the sink device 51 of the monitor system B, the value of the local system parameter is unconditionally changed so as to be equal to the value of the system parameter received from the source device 1 (S443), because the value of the system parameter received from the source device 1 is the value set by the navigation command.

In the operation described above, when a system parameter is updated in accordance with a navigation command (step S411 or S415) or when user operation information is sent from the user interface unit 54 of the monitor system B to which a sink device 51 other than the master sink device 51 belongs (step S424), the navigation manager 11 of the source device 1 checks the value of the local system parameter of the sink device 51 of the monitor system B and manages the values of the local system parameter of the sink device 51 of the monitor system B (step S412, S414, or S416).

As described above, the system parameters of the source device 1 and the local system parameters of the master sink device 51 change in accordance with the navigation command executed by the source device 1 or a user operation performed on the user interface unit 54 of the monitor system A to which the master sink device 51 belongs, and these values are controlled such that the local system parameters of the master sink device 51 are always equal to the system parameters of the source device 1. Thus, the audio stream and the subpicture stream decoded by the master sink device 51 and the button displayed on the master sink device 51 to indicate the selection status are switched in accordance with the navigation command recorded on the DVD-Video disk 2 and a user operation performed on the user interface unit 54 of the monitor system A to which the master sink device 51 belongs.

On the other hand, the local system parameters of the sink device 51 other than the master sink device 51 are changed in accordance with the navigation command executed by the source device 1 and a user operation performed on the user interface unit 54 of the monitor system B to which the sink device 51 other than the master sink device 51 belongs. Therefore, the local system parameters of the sink device 51 other than the master sink device 51 are not necessarily equal to the system parameters of the source device 1. More specifically, the, audio stream and the subpicture stream decoded by the sink device 51 other than the master sink device 51 and the button displayed on the master sink device 51 to indicate the selection status are switched in accordance with the navigation command recorded on the DVD-Video disk 2 and a user operation performed on the user interface unit 54 of the monitor system B to which the sink device 51 other than the master sink device 51 belongs.

Thus, it is possible not only to control the audio stream and the subpicture stream decoded by the master sink device 51 and the sink device 51 other than the master sink device 51 in accordance with the navigation command recorded on the DVD-Video disk 2, it is also possible to arbitrarily switch the audio stream or the subpicture stream decoded by the master sink device 51 and those decoded by the sink device 51 other than the master sink device 51 separately in accordance with a user operation.

Furthermore, it is possible not only to control the buttons displayed on the master sink device 51 and the sink device 51 other than the master sink device 51 to indicate the selection status in accordance with the navigation command recorded on the DVD-Video disk 2, it is also possible to switch the button indicating the selection status in accordance with a user operation separately for the master sink device 51 and the sink device 51 other than the master sink device 51.

Note that in the configuration described above, the user operation information is directly transmitted from the user interface unit 54 to the sink device 51 to update the local system parameters of the sink device 51, because direct transmission can avoid the delay which will occur if the local system parameters of the sink device 51 are updated via the source device 1.

In the case in which the local system parameters of the master sink device 51 are controlled so as to be equal to the system parameters of the source device 1 in the above-described manner, if the navigation data recorded on the DVD-Video disk 2 defines a playback sequence such that a following playback point can change depending on a stream being currently played back, then a playback point to be played back next is determined depending on a stream specified by the system parameters of the source device 1, that is, depending on a stream being currently played back on the master sink device 51.

Alternatively, in the case in which the navigation data recorded on the DVD-Video disk 2 defines a playback sequence such that a following playback point can change depending on a stream being currently played back, a next playback point may be determined taking into account a stream being currently played back on the sink device 51 other than the master sink device 51.

More specifically, in the case in which the navigation data defines a playback sequence such that a following playback point can change depending on a stream being currently played back, when the stream specified by the system parameters (SPRM(1) and the SPRM(2)) of the source device 1 is different from the stream specified by the local system parameters (SPRM(1) and the SPRM(2)) of the sink device 51 of the monitor system B under the management, a determination is made as to which one of the set of the system parameters (SPRM(1) and SPRM(2)) of the source device 1 and the set of the local system parameters (SPRM(1) and SPRM(2)) of the sink device 51 was update more recently, and a playback point specified by the more recently updated set of system parameters is employed as a playback point to be played back next.

Alternatively, in the case in which the navigation data defines a playback sequence such that a following playback point can change depending on a stream being currently played back, when the stream specified by the system parameters (SPRM(1) and the SPRM(2)) of the source device 1 is different from the stream specified by the local system parameters (SPRM(1) and the SPRM(2)) of the sink device 51 of the monitor system B under the management, an inquiry may be issued to a user as to whether a next playback point should be determined according to the stream specified by the system parameters of the source device 1 or the stream specified by the local system parameters of the sink device 51 or as to which one of playback points corresponding to the respective streams should be played back, and a next playback point may be determined in accordance with a command issued by the user in response to the inquiry.

Now, button commands of the source device 1 and control thereof are described below. Button commands are navigation commands that are defined for respective buttons and that are executed when corresponding buttons are pressed.

When a button on the user interface unit 54 of the monitor system 5 to which the master sink device 51 belongs is pressed by a user, the navigation manager 11 of the source device 1 executes a button command defined for the button indicated by the system parameter (SPRM(8)) of the source device 1. In a case in which a button on the user interface unit 54 of the monitor system B to which the sink device 51 other than the master sink device 51 belongs is pressed by a user, the navigation manager 11 executes a button command defined for the button indicated by the local system parameter (SPRM(8)) of the sink device 51 of the monitor system B under the management.

If the navigation data includes data defining that when a time-out of a particular period occurs, a button selected as of the occurrence of the time-out should be executed, a button command defined for the button indicated by the system parameter (SPRM(8)) of the source device 1 is unconditionally executed when the time-out occurs. Alternatively, the navigation manage 11 may execute a button command defined for a button indicated by a more recently updated one of the system parameter (SPRM(8)) of the source device 1 and the local system parameter (SPRM(8)) of the sink device 51 of the monitor system B under the management.

Alternatively, an inquiry may be issued to a user as to which one of the button indicated by the system parameter (SPRM(8)) of the source device 1 and the button indicated by the local system parameter (SPRM(8)) of the sink device 51 of the monitor system B under the management should be employed as the button to be executed, and the button command defined for the button selected by the user in response to the inquiry is executed.

Figure 5A:
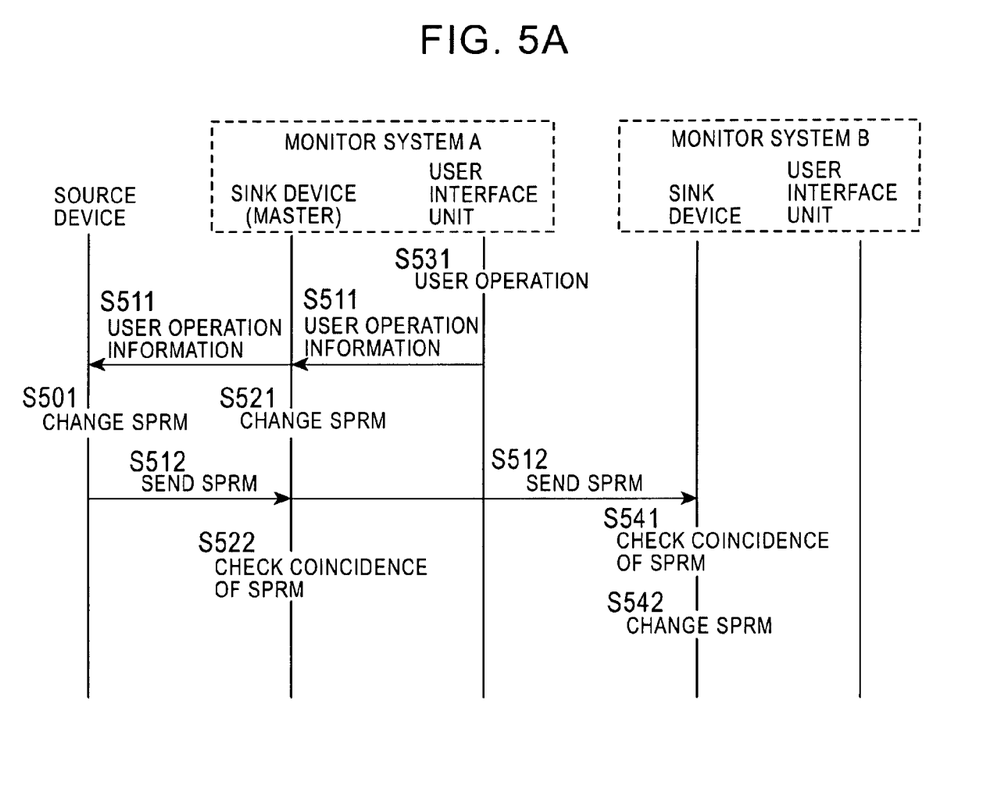
FIG. 5 is a sequence diagram showing an example of an operation of a DVD video playback system according to an embodiment of the present invention.

As shown in FIG. 5A, the selected and highlighted button number SPRM(8) may be controlled such that permission to select or determine a button is not given to the user interface unit 54 of the monitor system 5 to which the sink device 51 other than the master sink device 51 belongs, and the local system parameter (SPRM(8)) of the sink device 51 other than the master sink device 51 is unconditionally set to be equal to the system parameter (SPRM(8)) notified from the source device 1.

For example, as shown in FIG. 5A, if the user interface unit 54 of the monitor system A is operated by a user to issue a command to change the selection button (step S531), the user interface unit 54 sends user operation information indicating the content of the operation to the source device 1 and the master sink device 51 of the monitor system A (step S511).

If the master sink device 51 receives the user operation information, the master sink device 51 changes the value of the local system parameter (SPRM(8)) in accordance with the received user operation information (step S521). On the other hand, if the source device 1 receives the user operation information, the source device 1 changes the value of the system parameter (SPRM(8)) of the source device 1 in accordance with the received user operation information, because the received user operation information is that sent from the user interface unit 54 of the monitor system A to which the master sink device 51 belongs to (step S501).

Thereafter, the source device 1 sends, to each sink device 51, the value of the system parameter changed in accordance with the operation performed on the user interface unit 54 of the monitor system A (step S512). In this case, in the master sink device 51 of the monitor system A, it is determined that the value of the local system parameter (SPRM(8)) is equal to the value of the system parameter (SPRM(8)) received from the source device 1 (step S522), and thus the value of the local system parameter (SPRM(8)) is not changed. However, in the sink device 51 of the monitor system B, if the answer to the determination (step S541) as to whether the value of the local system parameter (SPRM(8)) is equal to the value of the system parameter (SPRM(8)) received from the source device 1 is negative, the value of the local system parameter (SPRM(8)) is changed so as to be equal to the value of the system parameter (SPRM(8)) received from the source device 1 (step S542).

Figure 5B:
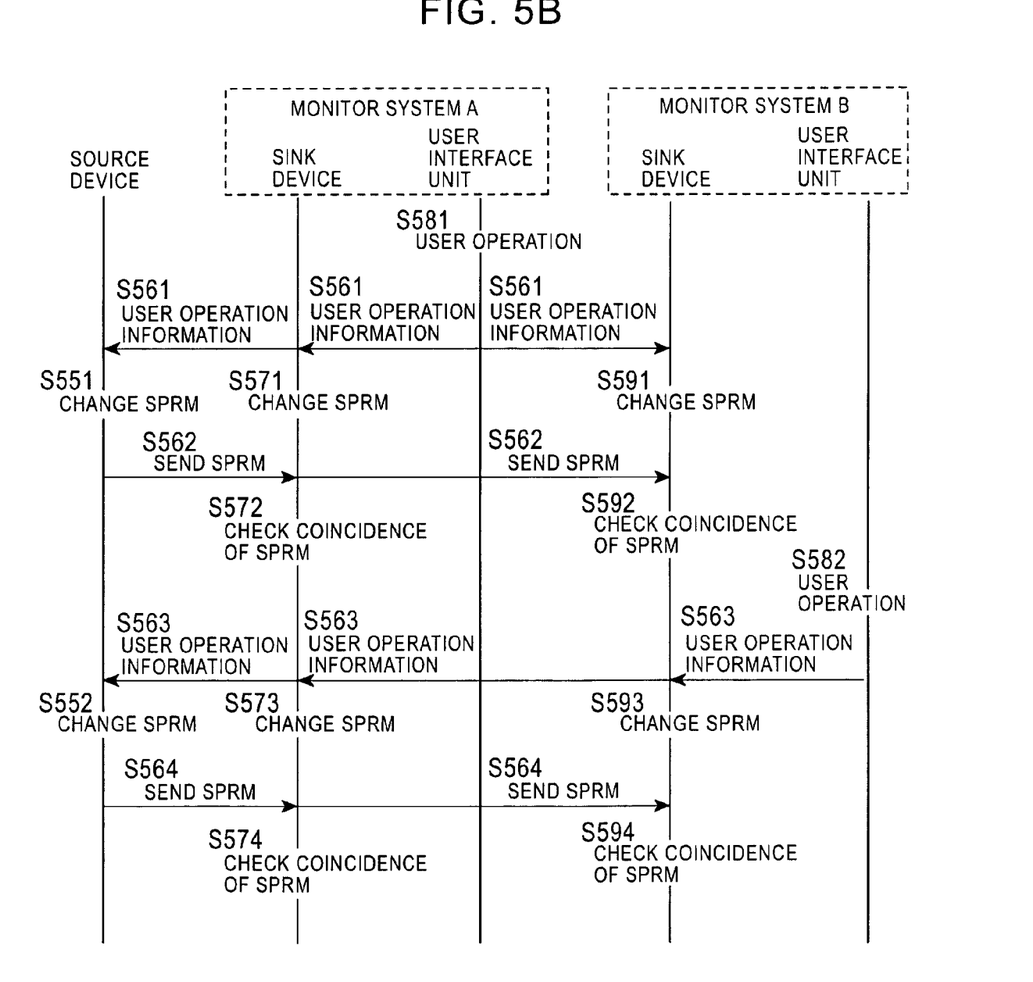

As for the selected and highlighted button number (SPRM(8)), as shown in FIG. 5B, selection or determination of a button via the user interface unit 54 of any monitor system 5 may be allowed, and the local system parameter (SPRM(8)) of each sink device 51 may be controlled so as to be always equal to the value of the system parameter (SPRM(8)) of the source device 1.

More specifically, as shown in FIG. 5B, if a user operation is performed on the user interface unit 54 of the monitor system A to issue a selection button change command (step S581), the user interface unit 54 sends user operation information indicating the content of the operation to the source device 1 and all sink devices 51 (step S561). If each sink device 51 receives the user operation information, the sink device 51 changes the value of the local system parameter (SPRM(8)) in accordance with the received user operation information (steps S571 or S591). The source device 1 also changes the value of the system parameter (SPRM(8)) according to the received user operation information (step S551).

Thereafter, the source device 1 sends the changed value of the system parameter to each sink device 51 (step S562). In this specific case, in each sink device 51, it is determined that the value of the local system parameter (SPRM(8)) is equal to the value of the system parameter (SPRM(8)) received from the source device 1 (step S572 or S592), and thus no change is made in the value of the local system parameter (SPRM(8)).

On the other hand, if a user operation is performed on the user interface unit 54 of the monitor system B to issue a selection button change command (step S582), the user interface unit 54 sends user operation information indicating the content of the operation to the source device 1 and all sink device 51 (step S563). Thereafter, processes (steps S552, S573, S593, S564, S574, and S594) are performed in a similar manner to the process (step S561) performed in response to the user operation information sent from the user interface unit 54 of the monitor system B.

In the operation shown in FIG. 5A or 5B, if the system parameters are updated in the source device 1 in accordance with the navigation command, processing is performed in a similar manner as described above with reference to FIG. 4. Furthermore, in the operation shown in FIG. 5A or 5B, when a user operation is performed to specify a button or when a button selected as of an occurrence of a time-out is employed as the selected button, the button indicated by the system parameter (SPRM(8)) of the source device 1 is employed as the selected button.

The present invention has been described above with reference to specific embodiments. In the embodiments described above, the system parameters sent from the source device 1 to each sink device 51 may include an angle number (SPRM(3)) indicating an angle stream to be decoded by the video decoder 5142, and the local system parameters of each sink device 51 include an angle number SPRM (3). In this case, the control of the system parameter SPRM(3) and the local system parameter SPRM(3), and the control of the process associated with the angle stream are performed in a similar manner to the control associated with the subpicture stream or the audio stream.

The technique of transmitting control information by which to control the DVD video playback system from the source device 1 to the sink device 51 by incorporating the control information into the PS in which presentation data are multiplexed, and the technique of processing the system parameters of the source device 1 and the local system parameters of each sink device 51 in accordance with the user operation performed on the user interface unit 54 may also be applied to a DVD playback system adapted to play back a DVD disk such as a DVD-Audio disk, other than a DVD-Video disk, on which a PS including a presentation data and navigation data is recorded in a multiplexed form.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. A DVD (digital versatile disk) video playback system comprising a source device operable to read data from a DVD-Video disk, a user interface configured to accept a user operation, and a plurality of sink devices in communication with the source device, the source device comprising:
 a transmission unit operable to transmit a program stream read from the DVD-Video disk to a plurality of sink devices, the program stream including presentation data in a multiplexed form; and
 a control information unit operable to incorporate control information into the program stream to be transmitted by the transmission unit, the control information not included in the original program stream read from the DVD-Video disk, the control information operable to control the decoding of the presentation data multiplexed in the original program stream;
wherein the control information unit is configured to incorporate at least one of a plurality of system parameters associated with a DVD-Video standard into the program stream to be transmitted, the plurality of system parameters being playback control parameters which control playback of the DVD-Video disk on the source device; and
each sink device of the plurality of sink devices comprising:
a decoder operable to decode the presentation data extracted from the program stream received from the source device and generate a resultant decoded presentation data; and
a decode controller operable to control the decoding performed by the decoder in accordance with the control information extracted from the program stream;
wherein when the user interface unit accepts a user operation intended to control one of the plurality of sink devices, the user interface unit is configured to send user operation information indicating the accepted user operation to the source device and the one of the plurality of sink devices;
wherein the decode controller of each sink device of the plurality of sink devices is configured to store, as a local system parameter, a playback control parameter operable to control decoding of the presentation data performed by the corresponding decoder, and, when the user operation information is received from the user interface unit, the decode controller is configured to change the local system parameter in accordance with the received user operation information; and
wherein when the source device receives the user operation information from the user interface unit, the source device is configured to change a system parameter associated with the source device in accordance with the received user operation information.

2. The DVD video playback system according to claim 1, wherein
the program stream includes a first navigation pack multiplexed therein in accordance with the DVD-Video standard, and
the control information unit incorporates into the program stream to be transmitted a portion of navigation data not included in an original navigation pack multiplexed in the original program stream read from the DVD-Video disk.

3. The DVD video playback system according to claim 2, wherein the control information unit multiplexes a pack in which the portion of the navigation data is stored into the program stream to be transmitted.

4. The DVD video playback system according to claim 1, wherein
the program stream includes a navigation pack multiplexed therein in accordance with the DVD-Video standard, and
the control information unit is operable to store the at least one of the plurality of system parameters in an unused area of the navigation pack multiplexed in the program stream to be transmitted.

5. The DVD video playback system according to claim 1 wherein each decode controller changes the local system parameter so as to be equal to a system parameter extracted from the program stream received from the source device.

6. The DVD video playback system according to claim 1, wherein the DVD video playback system is installed in a vehicle.

7. A DVD (digital versatile disk) video playback system comprising a source device operable to read data from a DVD-Video disk, a user interface configured to accept a user operation, and a plurality of sink devices in communication with the source device,
the source device comprising:
a transmission unit operable to transmit a program stream read from the DVD-Video disk to a plurality of sink devices, the program stream including presentation data in a multiplexed form; and
a control information unit operable to incorporate control information into the program stream to be transmitted by the transmission unit, the control information not included in the original program stream read from the DVD-Video disk, the control information operable to control the decoding of the presentation data multiplexed in the original program stream;
wherein the control information unit is configured to incorporate at least one of a plurality of system parameters associated with a DVD-Video standard into the program stream to be transmitted, the plurality of system parameters being playback control parameters which control playback of the DVD-Video disk on the source device; and each sink device of the plurality of sink devices comprising:
a decoder operable to decode the presentation data extracted from the program stream received from the source device and generate a resultant decoded presentation data; and
a decode controller operable to control the decoding performed by the decoder in accordance with the control information extracted from the program stream;
wherein when the user interface unit accepts a user operation intended to control one of the plurality of sink devices, the user interface unit is configured to send user operation information indicating the accepted user operation to the source device and the one of the plurality of sink device to be controlled;
wherein each of the plurality of sink devices is configured to store, as a local system parameter, a playback control parameter operable to control decoding of the presentation data performed by the corresponding decoder, and, when the user operation information is received from the user interface unit, the decode controller is configured to change the local system parameter in accordance with the user operation indicated by the received user operation information; and
wherein when the source device receives, from the user interface, the user operation information indicating the user operation intended to control a predetermined particular one of the plurality of sink devices, the source device is configured to change the system parameter associated with the source device in accordance with the user operation indicated by the received user operation information.

8. A DVD (digital versatile disk) video playback system comprising a source device operable to read data from a DVD-Video disk, a user interface configured to accept a user operation, and a plurality of sink devices in communication with the source device,
the source device comprising:
a transmission unit operable to transmit a program stream read from the DVD-Video disk to a plurality of sink devices, the program stream including presentation data in a multiplexed form; and a control information unit operable to incorporate control information into the program stream to be transmitted by the transmission unit, the control information not included in the original program stream read from the DVD-Video disk, the control information operable to control the decoding of the presentation data multiplexed in the original program stream;

wherein the control information unit is configured to incorporate at least one of a plurality of system parameters associated with a DVD-Video standard into the program stream to be transmitted, the plurality of system parameters being playback control parameters which control playback of the DVD-Video disk on the source device; and each sink device of the plurality of sink devices comprising:

a decoder operable to decode the presentation data extracted from the program stream received from the source device and generate a resultant decoded presentation data; and a decode controller operable to control the decoding performed by the decoder in accordance with the control information extracted from the program stream;

wherein when the user interface unit accepts a user operation intended to control one of the plurality of sink devices, the user interface unit is configured to send user operation information indicating the accepted user operation to the source device and the one of the plurality of sink devices to be controlled, wherein each of the plurality of sink devices is configured to store, as a local system parameter, a playback control parameter operable to control decoding of the presentation data performed by the corresponding decoder, and, when the user operation information is received from the user interface unit, the decode controller is configured to change the local system parameter in accordance with the user operation indicated by the received user operation information; and wherein the source device comprises:

a sink parameter manager configured to manage a local system parameter of each of the plurality of sink devices in accordance with the user operation information received from the user interface unit, the user operation information indicating the user operation intended to control each of the plurality of sink devices, and a system parameter conflict resolver configured to resolve system parameter conflict such that when conflict in a playback condition of the DVD-Video disk occurs which cannot be resolved even if any local system parameter value managed by the sink parameter manager is employed as the value of a corresponding system parameter of the source device, the local system parameter values managed by the sink parameter manager are employed as candidates for the value of the system parameter, one value is selected from the candidates for the value of the system parameter in accordance with a predetermined rule, and the selected value is used as the value of the system parameter of the source device in a subsequent operation.

9. The DVD video playback system according to claim 8, wherein the system parameter conflict resolver selects a most recently updated value from the candidates for the value of the system parameter and employs the selected value as the system parameter value for use thereafter for the source device.

10. The DVD video playback system according to claim 8, wherein the system parameter conflict resolver selects a value specified by a user from the candidates for the value of system parameter and employs the selected value as the system parameter value for use thereafter for the source device.

11. A method of playing back a DVD disk in a DVD playback system comprising a source device operable to read data from a DVD disk, a plurality of sink devices in communication with the source device and a user interface unit operable to accept a user operation, the method comprising:

transmitting, from the source device, a program stream including presentation data in a multiplexed form read from the DVD disk to the plurality of sink devices;

decoding the presentation data extracted from the program stream received from the source device and generating a resultant decoded presentation data within at least one of the plurality of sink devices;

if the user interface unit accepts a user operation intended to control a particular one of the plurality of sink devices, sending user operation information indicating the accepted user operation from the user interface unit to the source device and the particular sink device to be controlled;

in each of the plurality of sink devices, if the user operation information is received from the user interface unit, changing a local system parameter, which is a playback control parameter operable to control decoding of the presentation data, in accordance with the received user operation information; and in the source device, if the user operation information indicating the user operation intended to control a predetermined particular one of the plurality of sink devices is received from the user interface unit, changing a system parameter, which is a playback control parameter by which to control playback of the DVD disk on the source device, in accordance with the received user operation information.

12. A method of playing back a DVD disk in a DVD playback system comprising a source device adapted to read data from a DVD disk, a plurality of sink devices in communication with the source device and a user interface unit operable to accept a user operation, the method comprising:

transmitting a program stream including presentation data in a multiplexed form read from the DVD disk from the source device to the plurality of sink devices;

decoding the presentation data extracted from the program stream received from the source device in at least one of the plurality of sink devices and generating a resultant decoded presentation data;

if the user interface unit accepts a user operation intended to control a particular one of the plurality of sink devices, sending user operation information indicating the accepted user operation to the source device and the particular sink device to be controlled;

in each of the plurality of sink devices, if the user operation information is received from the user interface unit, changing a local system parameter, which is a playback control parameter by which to control decoding of the presentation data, in accordance with the received user operation information; and in the source device, managing a local system parameter of each of the plurality of sink devices in accordance with the user operation information received from the user interface unit and selecting a value of a system parameter such that when conflict in a playback condition of the DVD-Video disk occurs which cannot be resolved even if any local system parameter is employed as the value of a corresponding system parameter of the source device, the local system parameter values are employed as candidates for the value of the system parameter, one local value is selected from the candidates for the value of the system parameter in accordance with a predetermined rule, and the selected local value is used as the value of the system parameter of the source device in a subsequent operation.

* * * * *